United States Patent
Blanchard

[19]
[11] Patent Number: 5,913,031
[45] Date of Patent: *Jun. 15, 1999

[54] ENCODER SYSTEM LEVEL BUFFER MANAGEMENT

[75] Inventor: Simon Blanchard, Horley, United Kingdom

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/565,698

[22] Filed: Nov. 30, 1995

Related U.S. Application Data

[63] Continuation of application No. 08/565,698, Nov. 30, 1995, abandoned.

[30] Foreign Application Priority Data

Dec. 2, 1994 [GB] United Kingdom .................... 9424437

[51] Int. Cl.$^6$ ............................. H04N 5/76; H04Q 11/04
[52] U.S. Cl. .................... 395/200.34; 348/512; 370/506; 358/426
[58] Field of Search ...................................... 348/419, 423, 348/390, 426, 409, 415, 512, 515; 370/506, 522; 358/261.2, 426; 364/514 R; 395/200.34

[56] References Cited

U.S. PATENT DOCUMENTS

| | | | |
|---|---|---|---|
| 5,241,383 | 8/1993 | Chen et al. | 358/136 |
| 5,619,341 | 4/1997 | Auyeung et al. | 348/419 |
| 5,793,431 | 8/1998 | Blanchard | 348/423 |

OTHER PUBLICATIONS

PHB 33,950, U.S. Application No. 08/565,697, filed Nov. 30, 1995, pending.

*Primary Examiner*—Kamini Shah
*Attorney, Agent, or Firm*—Laurie E. Gathman

[57] ABSTRACT

A system is provided for encoding clips of video data for multiplexing into a system level stream with associated audio and control data. By deriving a relationship between encoder and decoder buffer occupancy levels, and taking into account buffer fill rate, the multiplexer targets a starting occupancy for the video system layer buffer (the MPEG STD) at that for the decoders video buffer (the MPEG VBV). With knowledge of fill rate, the decoder buffer need only be filled to a predetermined level prior to reading out clips for decoding, rather than filling the buffer completely, and seamless joining of video clips can then be simply achieved. The technique has particular application to interactive multimedia systems where continuous display is required.

9 Claims, 5 Drawing Sheets

ENCODER SYSTEM LEVEL BUFFER MANAGEMENT

CROSS REFERENCE TO RELATED APPLICATIONS

This is a continuation of application Ser. No. 08/565,698 filed Nov. 30, 1995 now abandoned.

BACKGROUND OF THE INVENTION

The present invention relates to the encoding of audio and video signals and in particular to producing segments of audio and video material that can be joined together on the fly.

It is typically the case that, when two video clips are required to be played one after the other, the decoder is required to reset itself to a starting state before decoding the second clip. During this reset, the user will be presented with the last frame of the first clip frozen on the screen, together with a mute of the accompanying audio. This discontinuity is intrusive to the user.

What is required is a seamless join in which the transition between the end of one clip and the start of the next is not noticeable to the decoder. This implies that from the user's point of view there is no perceptible change in the viewed frame rate and the audio continues uninterrupted. Applications for seamless video are numerous. An example from a CD-i perspective is the use of photo-real backgrounds for computer generated characters; an example use of this technique would be an animated character running in front of an MPEG coded video sequence. Another is a series of character-user interactions such as interactive movies where the viewer has the chance to influence development of the storyline by selecting from available alternative scenarios. Branch points along the path a user chooses to take through an interactive movie should appear seamless, otherwise the user will lose the suspension of disbelief normally associated with watching a movie.

A method for encoding segments of video such that re-initialisation of the decoder is not required is described in our UK Patent Application number 9424436.5 (PHB 33950) entitled "Video Editing Buffer Management" filed Dec. 2, 1994. The method uses targeting of decoder buffer levels to give consistency of decoder buffer occupancy for the end of each video clip and predictability for the start of each segment such as to allow successive clips to be joined directly without risking overflow or underflow in the decoder buffer.

The above method, whilst suitable for sequences of video frames, takes no account of the other information that will typically accompany it—for example an audio soundtrack. The video will generally be interleaved with other information into a single stream, referred to as the system stream, which constitutes the data that will be presented to a decoder/display device (for example the data stream read from a compact disc or delivered via a cable network).

SUMMARY OF THE INVENTION

It is therefore an object of the present invention to provide for seamless joining of system stream segments whilst avoiding overflow or underflow in the decoders buffer.

In accordance with the present invention there is provided a method for encoding of digital video signals, in the form of segments each comprising two or more pictures, and in an encoder apparatus having a coding stage, an encoder buffer, and means for interleaving the encoded video signal with at least one further signal to form a system stream, the method comprising, for each segment, the steps of: successively encoding the pictures of the segment according to a predetermined coding scheme; reading the encoded pictures into the buffer; reading the encoded segment out of the buffer at a substantially constant bit rate; and interleaving the buffer output signal into a system stream; characterised in that the encoder buffer occupancy is controlled to have a first predetermined level at the moment the last picture of a first segment has been read into it, which occupancy level is related to a decoder buffer occupancy level, in that the time required to fill a decoder buffer to the said decoder buffer occupancy level at the constant bit rate is derived, and in that a time stamp is inserted into the system stream of a following segment indicating that the first picture of that segment is to be read out of the decoder buffer at that time after loading of the said following segment commenced.

As will be demonstrated hereinafter, the derivation of the instant at which a decoder should start to decode a received segment enables smooth joining of segments at the system stream level. Also, as the decoder buffer target level is a calculated level based on the encoder buffer contents, the conventional technique of having to fill the decoder buffer as full as possible before starting to decode is avoided.

Preferably, a common decoder buffer level (and hence time stamp positioning) is provided. This may be achieved by setting a target number of bits used to encode pictures of the first segment and controllably varying the bit allocation per picture during encoding such as to reach the said encoder buffer occupancy level at the end of the segment.

As will be described, in order to define the decoder buffer level, a maximum encoder buffer occupancy level is preferably specified, with the decoder buffer occupancy level being defined as the difference between the encoders maximum level and the encoder buffer occupancy level one frame period after the last picture of the first segment has been read into the encoder buffer.

Also in accordance with the present invention, there is provided a digital video signal encoder apparatus, configured for the encoding of image segments, where each segment comprises two or more pictures, the apparatus comprising: an encoding stage arranged to receive successive pictures of a segment and encode them according to a predetermined coding scheme; a buffer coupled to receive successive encoded pictures from the encoding stage and arranged to output encoded segments at a substantially constant bit rate; and a multiplexer coupled to receive the buffer output and at least one further signal and arranged to interleave them into a system stream; characterised in that the encoding stage is operable to encode pictures of a segment in a controllably variable number of bits, the apparatus further comprising target setting means arranged to control the number of bits used by the encoder such as to produce a predetermined encoder buffer occupancy at the moment the last picture of a first segment is read into the buffer, and time stamp means operable to derive a timing value based on the said predetermined occupancy and insert a time stamp in the system stream of the following segment indicating that the first picture of the following segment is to be read out of a decoder buffer following a delay given by the timing value from the point that loading of said following segment into the decoder buffer commenced.

The target setting means may suitably be arranged to control the number of bits per picture for the last K pictures of a segment as described above, and the encoding stage may suitably be arranged to provide zero-value bit stuffing where less than the specified number of bits are required to code a picture.

Further in accordance with the present invention there is provided a digital video image signal encoded by the method described above, together with an optical disc containing such a signal in the form of separately addressable segments.

Further features and advantages of the present invention will become apparent from reading of the following description, together with the attached claims, the disclosure of which is incorporated herein by reference.

BRIEF DESCRIPTION OF THE DRAWINGS

Preferred embodiments will now be described by way of example only, and with reference to the accompanying drawings in which.

DETAILED DESCRIPTION OF THE PREFERRED EMBODIMENT

The following description relates to encoders and decoders operating in accordance with MPEG standards and conventional nomenclature from those standards will be used hereinafter. It will be recognised by the skilled practitioner however, that use of the present invention is not constrained to the MPEG standard.

Any coding standard must be developed with models of how the encoder and decoder interface to one another. As an encoder runs it has to model what will happen in the decoder such that it never sends the decoder into an illegal state. Similarly, the decoder must support the same model the encoder used so that it remains in a legal state and produces the output the encoder intended. MPEG is no exception to this rule.

Initially, it will be useful to consider the production of segments of purely video data which can be seamlessly joined. A preferred method is described in our above-mentioned UK Application number 9424436.5 (PHB 33950) and is summarised below with reference to FIG. 1 which shows graphs of buffer occupancy B against time t showing what happens to the encoder and decoder buffer states as one sequence of video frames (pictures) A ends and another B starts. LA indicates the last picture of sequence A; FB indicates the first picture of sequence B. The change of delivery data from sequence A to sequence B is shown by a change in thickness of the buffer occupancy line with the chain-linked line indicating pictures from sequence A. At some time $t_x$ all the data for sequence A has been delivered and the VBV (Video Buffering Verifier—the MPEG decoder model) has an occupancy of $B_x$ bits. From this time on all the data delivered to the buffer is for sequence B. It will be noted, though, that some pictures from the end of sequence A are still in the buffer, which pictures are all removed by time $t_f$ when the buffer has an occupancy of $B_f$ bits.

The encoder goes through a process known as targeting when it tries to achieve a certain occupancy in the VBV buffer. During targeting the encoder assumes that the VBV buffer has a certain target occupancy when the first picture it has coded is put into the buffer. This places an upper limit on the size of the first picture. At the end of a coding run the encoder targets the VBV occupancy at the point in time just before the first picture for the next sequence would be removed from the buffer, point $B_t$ in FIG. 1. It targets this state by changing the size of the last, or last few pictures, as it codes.

Figure 1:
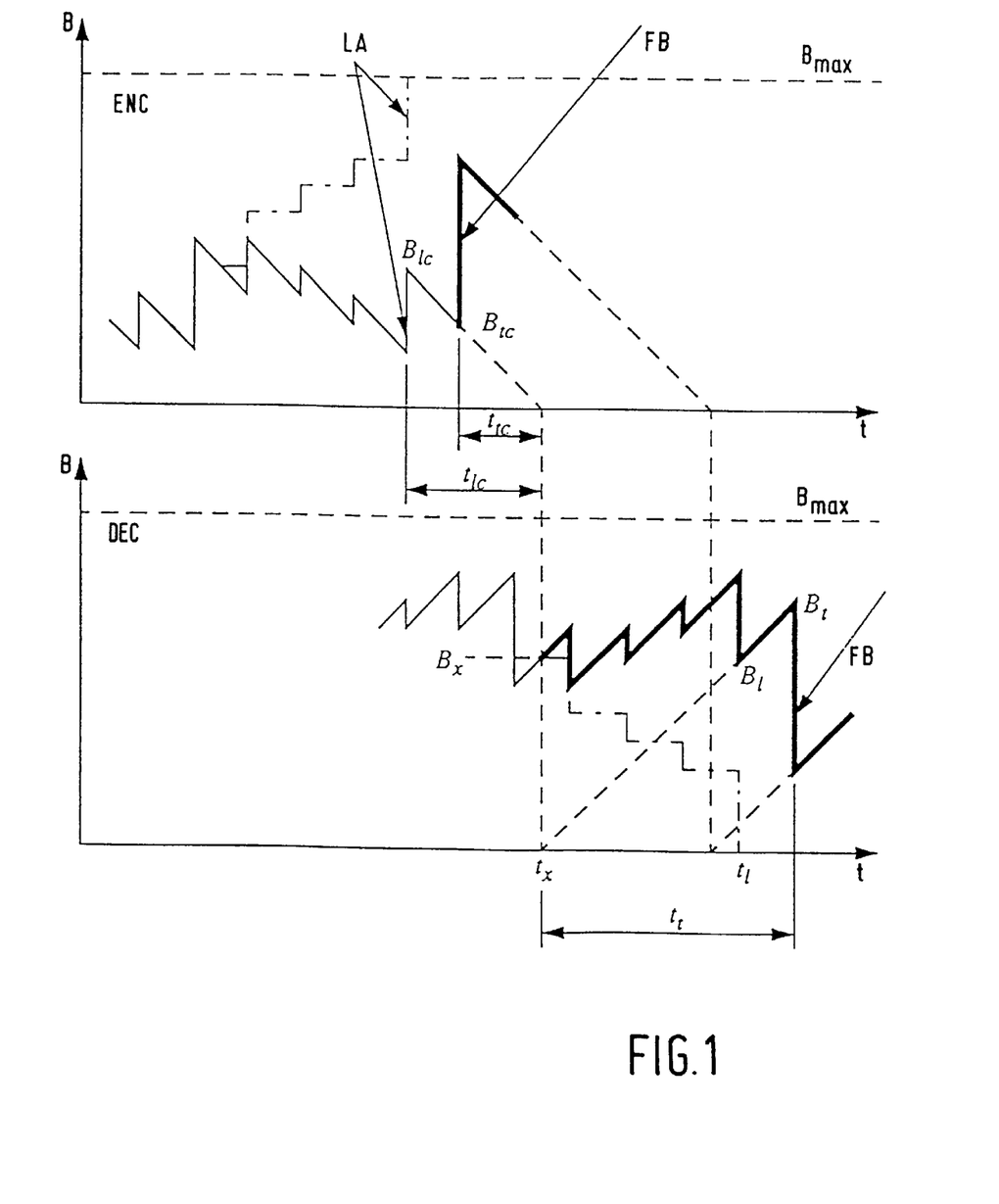
FIG. 1 represents encoder and decoder video buffer contents at the conjunction of two video clips.

In the example shown in FIG. 1 the encoder targets the state $B_t$. This state represents the VBV buffer occupancy at the time just before the first picture of the new sequence is removed. Since, when an encoder runs, it generally has no direct contact with the decoder, it manages picture sizes based on its output buffer rather than transforming to and from the VBV buffer state. Accordingly, the following passages will refer to $B_{tc}$ and $B_{lc}$ (see the encoder occupancy values in the upper portion of FIG. 1).

When targeting a start state the encoder assumes a certain occupancy in its buffer at the point when it introduces the first picture. This buffer occupancy is $B_{tc}$ bits which represents the residual bits from the end of the previous sequence. The presence of these bits limits the maximum size of the first picture to be $B_t$ bits and continues to have an effect on future picture sizes until all the bits have been removed after time $t_{rc}$.

From the encoder's point of view start state targeting is very simple since all that is required is for it to set its initial occupancy to $B_{tc}$ bits rather than the usual start state of being empty.

When the encoder approaches the end of a sequence it tries to target the point $B_{lc}$ by forcing the size of the last picture to be such that when put into the buffer the occupancy will increase to $B_{lc}$ bits. It could produce a very poor quality picture if a large degree of size fixing were applied to the last picture only. To overcome this, the encoder preferably has a target number of bits for the last GOP (Group of Pictures) and a target number of bits for each of the K pictures within the GOP, thus allowing the encoder to gradually approach the correct state.

Turning now to the system layer, this is produced when multiplexers combine video, audio and other elementary streams into one system stream. The system stream contains interleaved elementary streams and timing information in the form of System Clock References (SCR's), Presentation Time Stamps (PTS's) and Decoding Time Stamps (DTS's).

The multiplexer's job is to ensure that data is delivered from a system stream into the decoders' buffers fast enough so that they never completely empty and slow enough so that they never overflow. The MPEG standard defines a buffer called the System Target Decoder (STD) that is used to model the transfer of data from the Digital Storage Medium (DSM) into the decoder. The purpose of this buffer is to mask the fact that, because of data interleaving, delivery into a decoder is in bursts but the decoder performance model assumes a constant bit rate. The usual strategy for multiplexing video and audio streams typically starts by filling the STD buffer as full as possible. The SCR of the last pack made is then set so that the first picture is removed from the buffer at this time. Next, the SCRs of the previous packs are set to the correct values because they arrive ahead of this pack in time. Finally, the buffer is maintained as full as possible until all the data from the elementary stream has been consumed.

The multiplexer operation is somewhat more complex than this because the multiplexer has to juggle with multiple streams. Also a multiplexer has to support any additional features that are needed to meet the specification of a system stream as it has been defined for the target platform.

Figure 2:
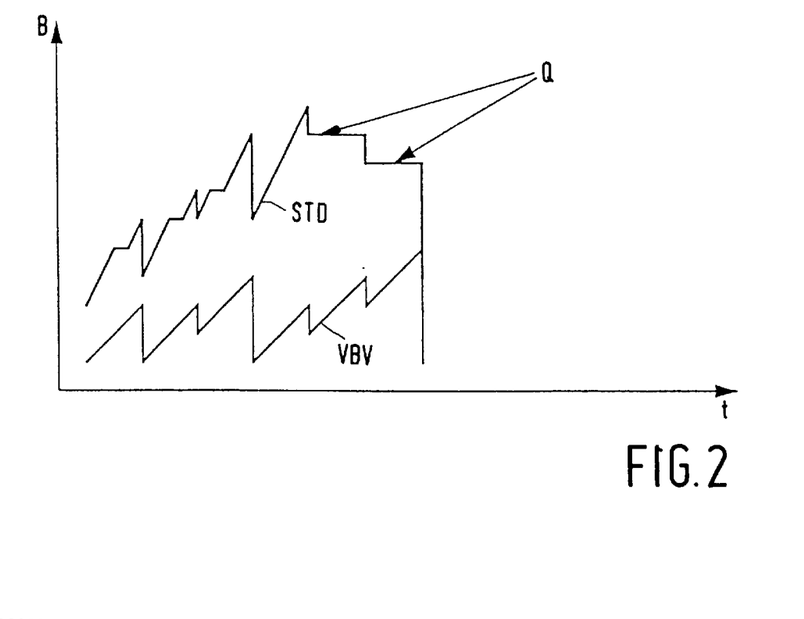
FIG. 2 represents the relationship between decoder video and system buffer occupancies.

The STD buffer can be thought of as enclosing the VBV buffer as shown in FIG. 2. The Figure represents a simplified view of the STD and VBV relationship. In FIG. 2 the STD buffer occupancy (thick line) is shown enclosing the VBV buffer. A point to note is that the slope of the STD buffer line is higher than that of the VBV line. This is because the bit rate of the DSM is higher than the coded video bit rate. It can also be seen that at times, indicated by reference Q, no data is delivered to the STD. This happens because either the bandwidth of the DSM is taken up by other elementary streams or the multiplexer has decided not to deliver data to the STD because of buffer management issues.

Figure 3:
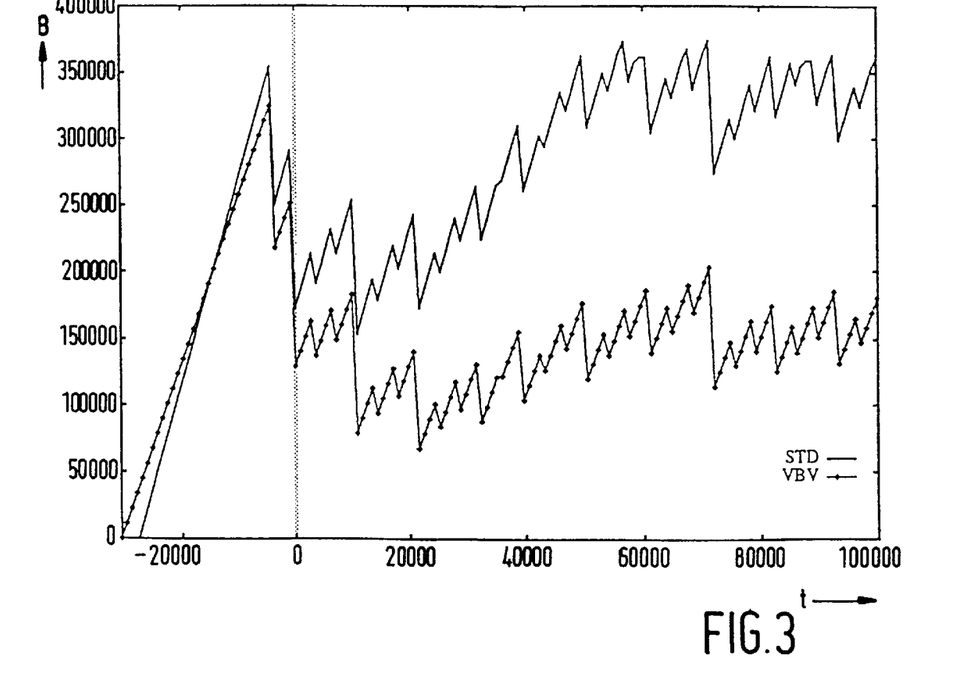
FIGS. 3 to 5 represent decoder video and system buffer contents in a conventional system, and at the start and finish of a targeted clip, respectively.

FIG. 3 shows graphs of what happens to the VBV and STD occupancy at the start of a decoding a normal, i.e not targeted, stream. In the graph, for ease of understanding, the times (in terms of system ticks) at which pictures are removed from the two buffers are shown as in synchronism with each other. The VBV has no concept of data delivery start time, only of picture removal time based on the VBV delay. In order for the graphs to line up, a constant offset was applied to the VBV sample times in the Figure.

In FIG. 3 it can be seen that the multiplexer and the encoder have followed a similar strategy at the start of clip. That is to say, their buffers have been filled up as much as possible before the first picture is removed, as described above. Also it can be seen that, in this case, the STD buffer occupancy line always contains the VBV occupancy. The exception to this rule is during start-up because the data rate of the DSM is higher than that of the VBV so delivery to the STD starts after the VBV.

Turning now to the production of system streams that can be concatenated together, the production of seamless system streams containing video will first be considered. Referring back to FIG. 1, it will be seen that the time taken for all the bits from the end of sequence A to be removed is dependent on how many pictures are in the buffer at the time when data delivery for sequence A stops. This time is dependent on the source material and the encoder used. Accordingly, the buffer occupancy ($B_x$) at time $t_x$ will vary from clip to clip. Therefore there is no way the multiplexer can calculate what $t_x$ and $B_x$ would be for the general case based on the knowledge that is usually available to it, ie. bit rate, frame rate and what $B_t$ was.

To avoid the problem of all the unknowns described above, we use the fact that the data in the buffer when delivery of sequence A stops is sufficient to cover the time it will take for constant rate delivery to deliver $B_t$ bits. We have recognised that this allows the setting of a maximum time for delivery of $B_t$ bits at the start of the multiplexed stream as:

$$t_t = \frac{B_t}{R} \quad (1)$$

where $t_t$ is as shown in FIG. 1, and R is the delivery rate.

This time is important to the multiplexer because it allows the setting of the SCR time at this point, since this is the point when the first picture should be removed from the STD buffer. Therefore, the multiplexer is set to fill the STD buffer to at least $B_t$ bits and set the SCRs so that at this time the first picture is removed. Note that this contrasts the conventional technique in which the buffer is filled as much as possible at which point the first picture is removed.

It should be pointed out here that the STD buffer is bigger than the VBV buffer. In the constrained system parameters case the STD buffer can be up to 46 kbytes compared to a maximum VBV size of 40 kbytes. This extra space allows the multiplexer to interleave different elementary streams into one system stream hiding the sporadic delivery to the decoder.

Figure 4:
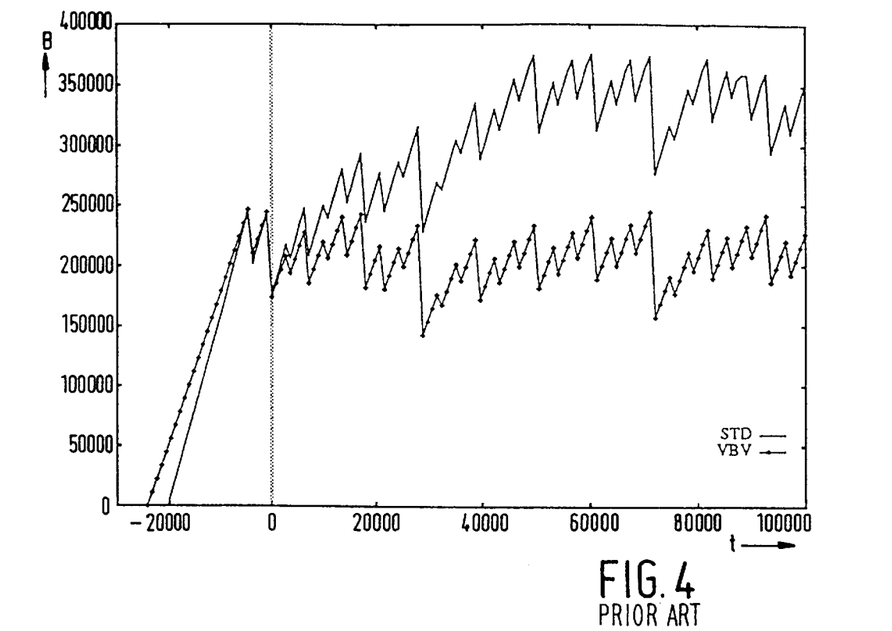

FIG. 4 shows graphs of what happens in the VBV and STD buffer at the start of a targeted multiplexing operation. As with FIG. 3 the graph shows occupancy B (bits) against time t in the form of system ticks (clock pulses). It will be noted that the occupancy of the VBV and STD buffers is the same at the point when the first picture is removed from the buffer. From that point on the occupancy of the STD buffer starts to overtake that of the VBV buffer because the data delivery rate is higher.

The multiplexer has far less control over the end state of the STD buffer. The end state is dependent on the size of the pictures still in the buffer which is controlled by the encoder. Preferably, the multiplexer attempts to deliver the data to the STD as soon as possible to guard against a problem known as SCR overlap: where data becomes due for a following clip when not all the data from the first clip has been delivered. A suggested multiplexer strategy for this is to make a data packet whenever the STD buffer can accept data no matter how small.

Figure 5:
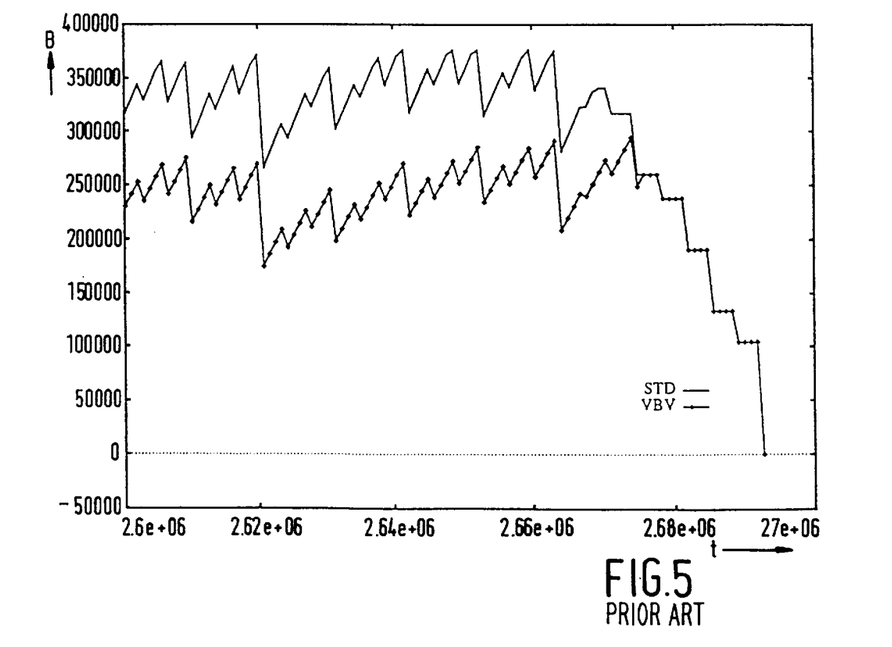

FIG. 5 shows graphs of the VBV and STD states at the end of a clip. It can be seen that delivery of data to the STD stops before the VBV because the STD buffer is larger and the received bit rate is higher. Towards the end of the clip the two graphs re-converge. This is the point in time when data delivery to both buffers has stopped and they contain only the pictures that make up the end of the clip. The time taken for these end pictures to be removed from the buffers is the time available for filling up the buffers with data from the next clip before the first picture of that clip is removed. This fill time is shown as time $t_t$ in FIG. 1.

Turning now to audio signals, there is no equivalent of the VBV buffer for audio which makes the production of seamless audio much simpler than for video. The reason for this is because audio is coded at a constant instantaneous bit rate: in other words, all similarly coded audio frames are the same size, to within one byte, whereas video frames vary in size depending on the frame type and complexity. It is, however, possible for the multiplexer to target an STD buffer state at the time when the first audio frame is removed in a similar way to that of video.

Figure 6:
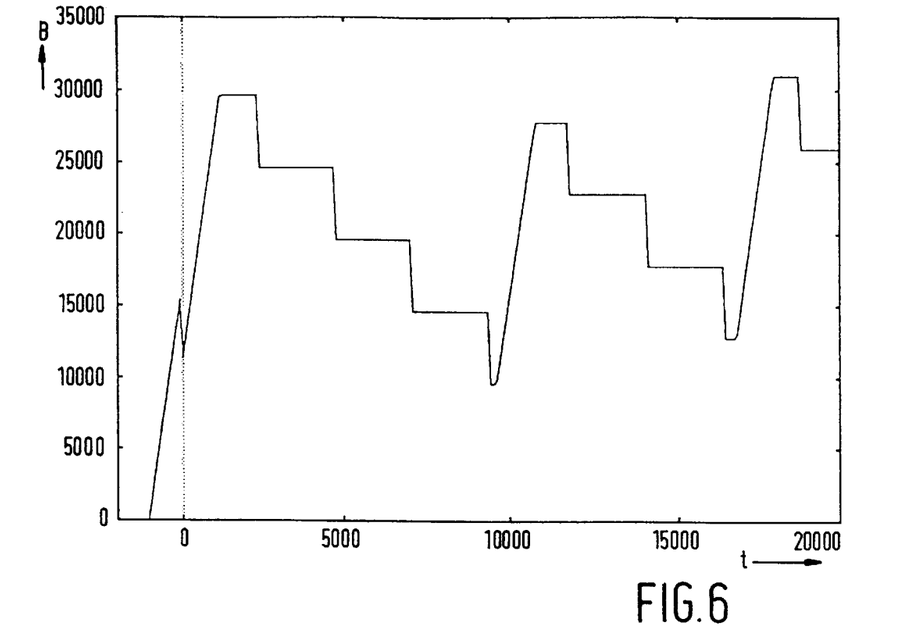
FIGS. 6 and 7 represent audio buffer contents at the start and finish of a targeted audio clip, respectively.

FIG. 6 shows a graph of the start of a targeted audio multiplexing operation. In this case the multiplexer targets the STD state at 2048 bytes (16384 bits) at the time when the first audio frame is removed. The fill time is analogous to $t_t$ in FIG. 1 and has the similar property that the time must not be greater than the time represented by the audio frames in the buffer when data delivery stops. When the multiplexer has reached its target and the first audio frame has been removed it follows the strategy of keeping the STD buffer as full as possible. The large increasing slopes of the graph represent the delivery of an audio packet. In this case an audio packet is about 2 kbytes big because it was multi- plexed for CD-i play-back with a CD-i sector about 2 kbytes big.

Figure 7:
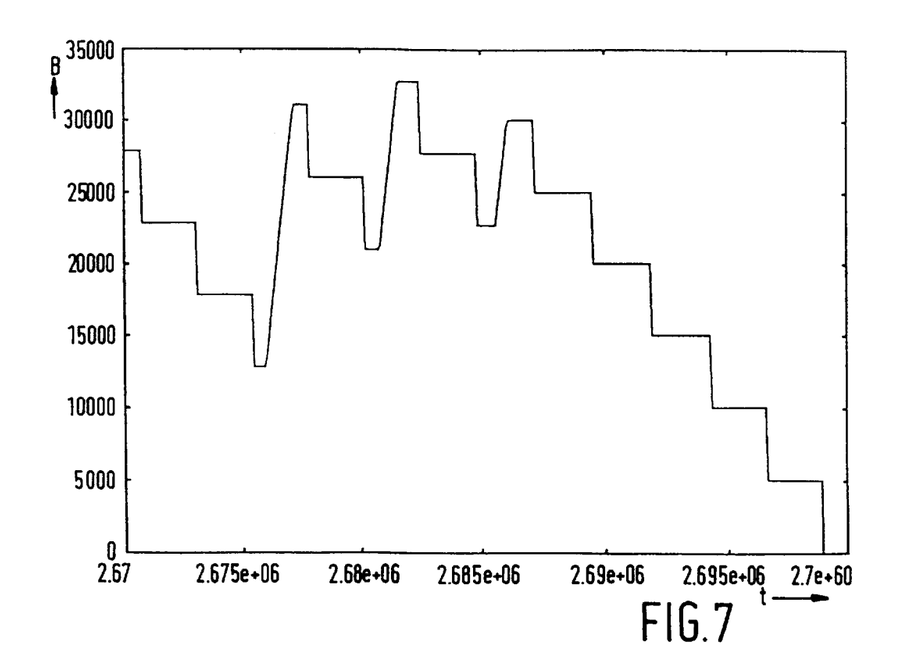

FIG. 7 shows a graph of what happens in the STD at the end of an audio clip. The regular stepping down of occu- pancy representing the audio frames in the buffer begins at the time when data delivery stops. These residual audio frames will mask the change over from the end of one audio clip to the next. They last a finite time depending on the number of frames but as can be seen by referring to FIG. 6 the time to fill the STD buffer to its target is so short compared to the time masked by the residual frames that STD underflow should not occur, assuming that the DSM bit rate is substantially higher than the audio bit rate. Our experiments have shown that, for audio, targeting the STD buffer at about 50% fullness gives acceptable results.

Figure 8:
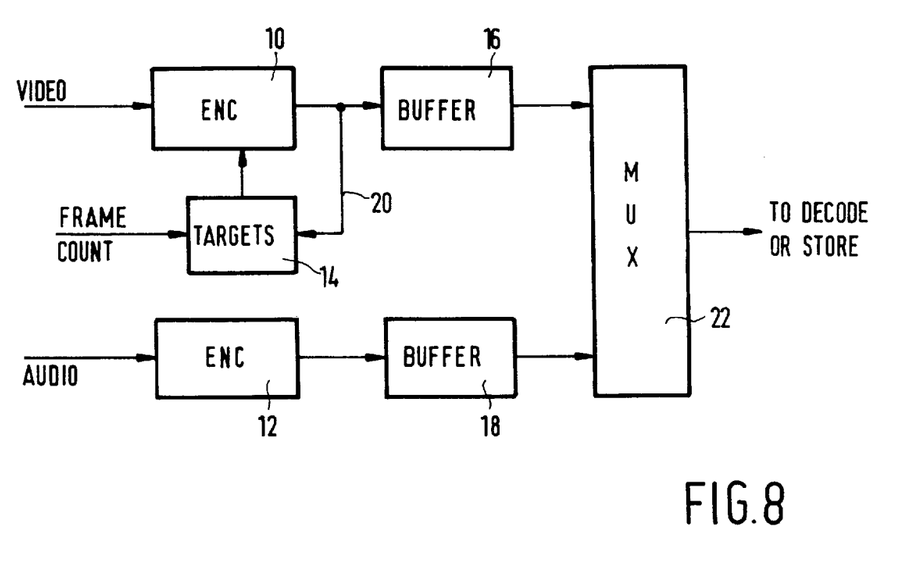
FIGS. 8 and 9 schematically represent encoder and decoder apparatus, respectively.

FIG. 8 shows an encoder apparatus having separate encoder stages 10, 12 for video V and audio A signals respectively. A further input for a frame reference signal FC identifying the frames within the video signal (such as by relative position with respect to the first and last pictures of a sequence) is connected to a target setting stage 14 which specifies the bit allocation for pictures of a sequence. It will be noted that there is no corresponding target stage for the audio encoder: this is not required due to the constant size of the encoded audio frames as described above.

The output from each of the encoder stages 10, 12 is shown as being passed to respective buffers 16, 18 (although in practise these will form part of the encoder stages). A feedback path 20 from the output of the video encoder stage 10 to the target setting unit 14 enables checking of whether the set targets have resulted in the required number of bits per picture in the encoded group.

The buffered outputs are interleaved by a multiplexer 22, which also inserts the time stamps, to form a single data stream DS (the system stream) which may then be transmitted to a decoder or stored on a suitable medium, such as a compact disc.

Figure 9:
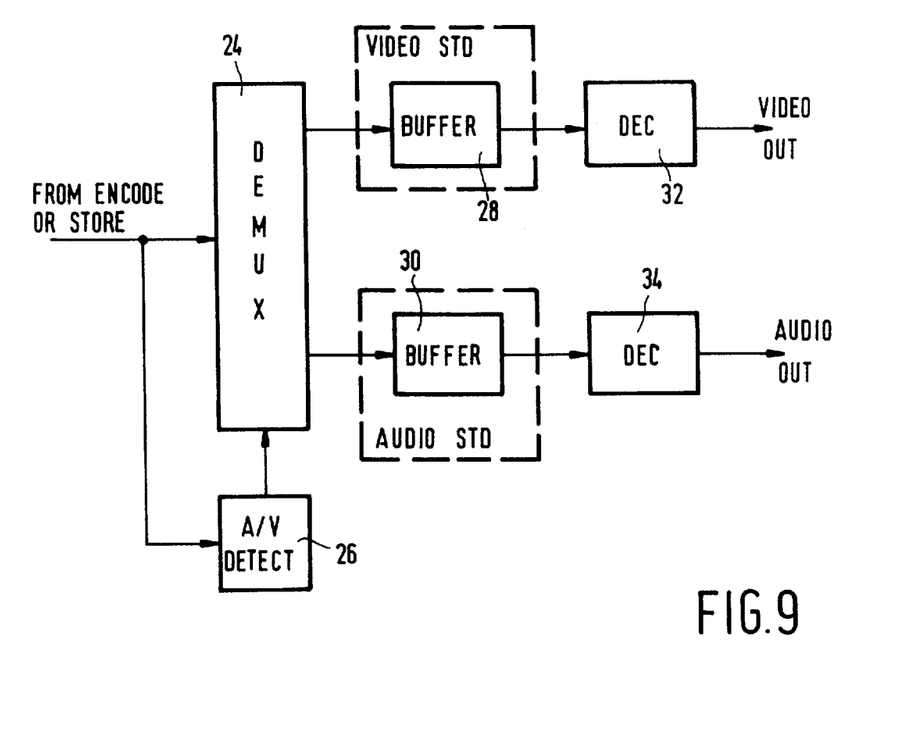

At the decoder (FIG. 9), a demultiplexer 24 separates the stream DS into video and audio channels by reference to a detector 26 monitoring the input stream. The separated video and audio streams are passed to respective buffers 28, 30 and from there to respective decoder stages 32, 34 to provide decoded output signals $V_{OUT}$, $A_{OUT}$. Whilst the buffers would in practise form part of the respective decoder stages, they are shown separate to illustrate more clearly the STD model.

From reading the present disclosure, other variations will be apparent to persons skilled in the art. Such variations may involve other features which are already known in the methods and apparatuses for editing of audio and/or video signals and component parts thereof and which may be used instead of or in addition to features already described herein. Although claims have been formulated in this application to particular combinations of features, it should be understood that the scope of the disclosure of the present application also includes any novel feature or any novel combination of features disclosed herein either implicitly or explicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A method for encoding digital video signals which are comprised of segments each comprising two or more pictures using an encoder apparatus which includes a coding stage, an encoder buffer, and means for interleaving the encoded video signal with at least one further signal to form a system stream, the method comprising, for each segment, the steps of:

successively encoding the pictures of the segment according to a predetermined coding scheme, to thereby produce encoded pictures;

reading the encoded pictures into the encoder buffer;

reading the encoded segment out of the encoder buffer at a substantially constant bit rate, to thereby produce a buffer output signal;

interleaving the buffer output signal, to thereby produce the system stream;

controlling an occupancy level of the encoder buffer in such a manner as to provide a predetermined encoder buffer occupancy level at a moment a last picture of a previous segment has been read into the encoder buffer, the predetermined encoder buffer occupancy level having a predetermined relationship to a prescribed occupancy level of a decoder buffer;

determining a filling time required to fill the decoder buffer to the prescribed decoder buffer occupancy level at the substantially constant bit rate starting at a time that loading of the following segment into the decoder buffer is commenced; and inserting a time stamp into the system stream of a following segment indicating a prescribed read-out time for a first picture of the following segment to be read out of the decoder buffer, wherein the prescribed read-out time is delayed from the time that the loading of the following segment into the decoder buffer is commenced, by a time delay equal to the determined filling time.

2. The method as claimed in claim 1, further comprising the step of controllably varying a target number of bits used to encode the pictures of the previous segment in a manner such as to achieve the predetermined encoder buffer occupancy level.

3. The method as claimed in claim 1, wherein a maximum encoder buffer occupancy level is specified, and the prescribed decoder buffer occupancy level is defined as the difference between the maximum encoder buffer occupancy level and the predetermined encoder buffer occupancy level one frame period after the last picture of the previous segment has been read into the encoder buffer.

4. The method as claimed in claim 2, wherein a respective target number of bits is specified for each of the last K pictures of the segment, where K is an integer.

5. The method as claimed in claim 1, wherein the pictures of the segment are encoded in the successively encoding step according to an MPEG standard.

6. A digital video signal encoder apparatus for encoding image segments each comprised of two or more pictures, the apparatus comprising:

an encoding stage arranged to receive successive pictures of each segment and encode the successive pictures according to a predetermined coding scheme, to thereby produce successive encoded pictures;

an encoder buffer coupled to receive the successive encoded pictures from the encoding stage and arranged to output encoded segments at a substantially constant bit rate, to thereby produce a buffer output;

a multiplexer coupled to receive the buffer output and at least one further signal and arranged to interleave them into a system stream;

wherein the encoding stage is operable to controllably vary the number of bits used to encode the pictures of each segment;

target setting means arranged to control, for each segment, the number of bits used by the encoder to encode the pictures of that segment in a manner such as to produce a predetermined encoder buffer occupancy level at a moment that a last picture of a previous segment is read into the encoder buffer;

time stamp means operable to derive, for each segment, a filling time required to fill a decoder buffer to a prescribed decoder buffer occupancy level at the substantially constant bit rate starting at a time that loading of a following segment is commenced and to insert a time stamp in the system stream of the following segment indicated a prescribed read-out time for a first picture of the following segment to be read out of the decoder buffer, wherein the prescribed read-out time is delayed from the time that the loading of the following segment into the decoder buffer is commenced, by a time delay equal to the determined filling time.

7. The apparatus as claimed in claim 6, wherein the target setting means is operable to control, for each segment, the number of bits used by the encoding stage to encode each picture, for the last K pictures of that segment, where K is an integer.

8. A digital video image signal which includes a plurality of segments encoded by a method according to claim 1, each segment comprising a sequence of pictures encoded according to a predetermined coding scheme, wherein each of the last K pictures of a segment (where K is an integer) are encoded in respective numbers of bits such that, when the encoded segment is read at a substantially constant bit rate into a decoder buffer from which successive pictures are removed for decoding at a real time display rate, a predetermined decoder buffer occupancy level occurs at the moment the data for the last picture of the segment has been read into the decoder buffer, and the system stream for each segment includes a time stamp indicating a prescribed read-out time for a first picture of the following segment to be read out of the decoder buffer, wherein the prescribed read-out time is delayed from the point following loading of that following segment into the decoder buffer by a time delay equal to a time required to fill the decoder buffer to the predetermined decoder buffer occupancy level starting at a time that loading of that following segment into the decoder buffer is commenced, the time delay specified by the time stamp being related to the predetermined decoder buffer occupancy level.

9. An optical disc carrying a digital video image signal comprised of a plurality of encoded segments as claimed in claim 8, wherein all segments provide a common predetermined decoder buffer occupancy level.

\* \* \* \* \*